W. E. TAIT AND W. MILNES.
CHUCK.
APPLICATION FILED JAN. 20, 1920.
1,379,658.
Patented May 31, 1921.
2 SHEETS—SHEET 2.
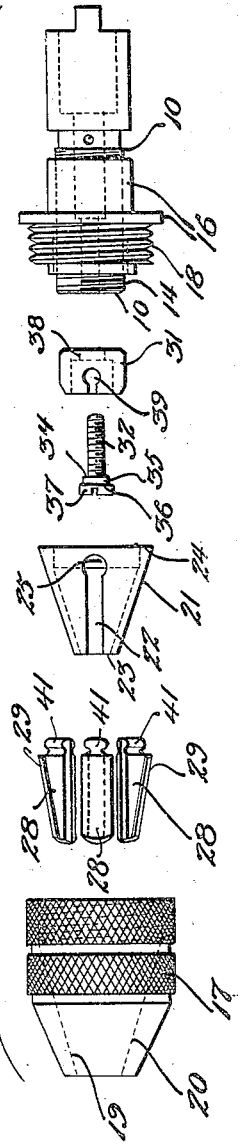
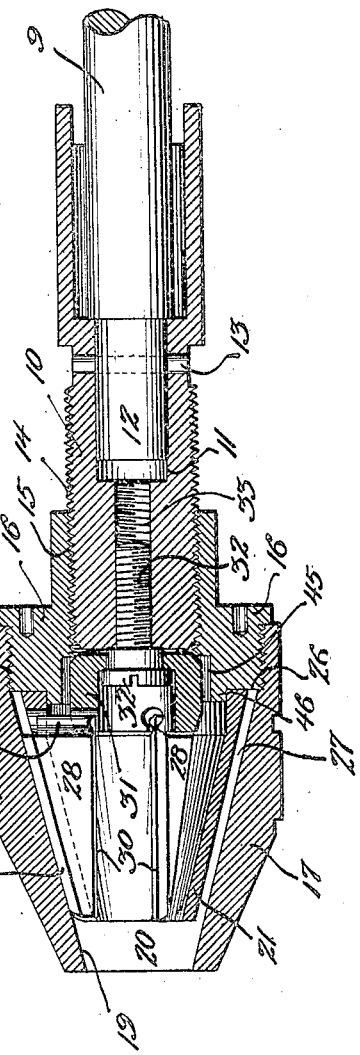

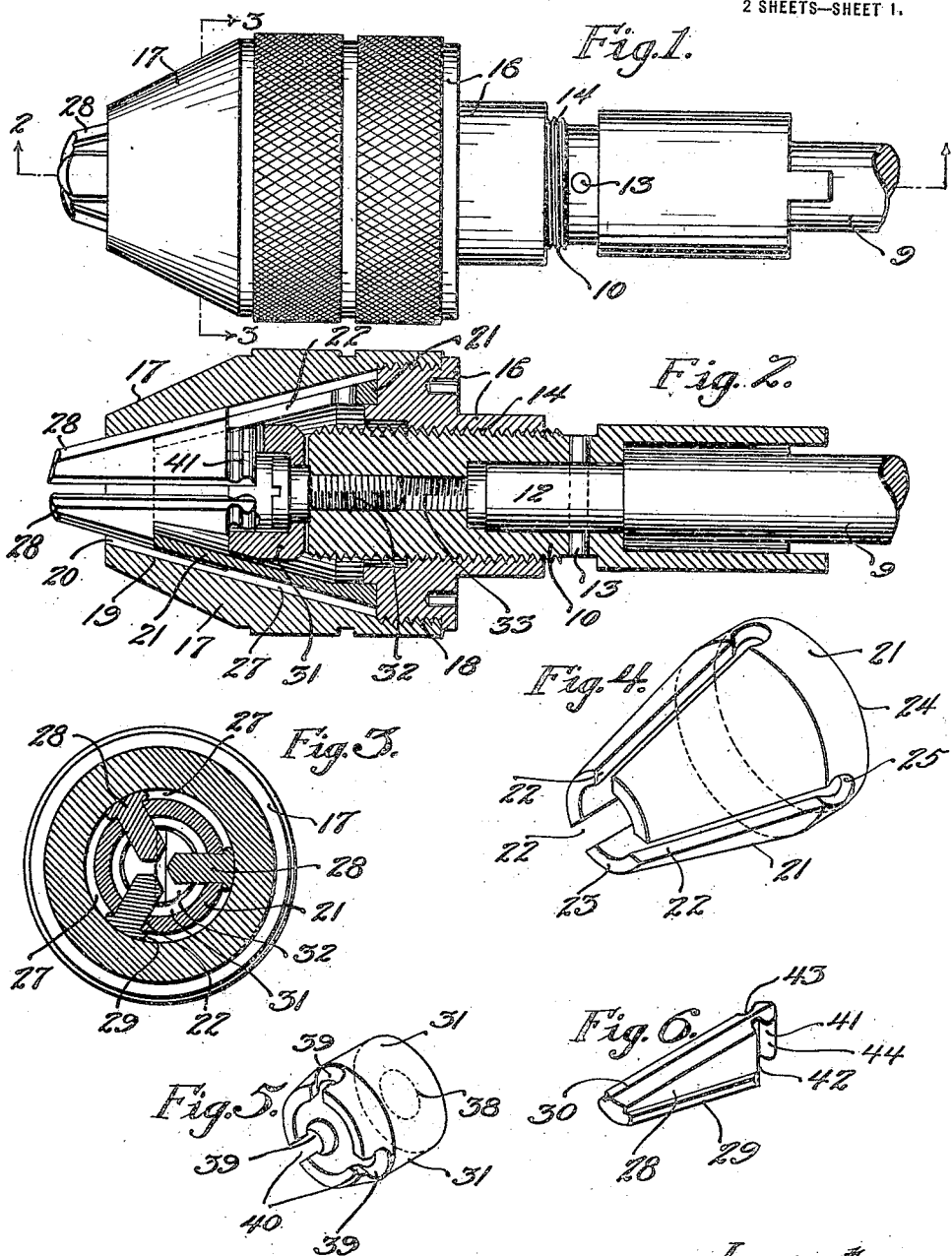

UNITED STATES PATENT OFFICE.

WILFRED E. TAIT AND WILLIAM MILNES, OF WINTHROP, MASSACHUSETTS.

CHUCK.

1,379,658. Specification of Letters Patent. Patented May 31, 1921.

Application filed January 20, 1920. Serial No. 352,853.

*To all whom it may concern:*

Be it known that we, WILFRED E. TAIT, a citizen of the United States, and WILLIAM MILNES, a subject of the King of Great Britain, residing at Winthrop, county of Suffolk, and State of Massachusetts, have invented certain new and useful Improvements in Chucks, of which the following is a specification.

One object of our invention is to provide an improved chuck which can be used in connection with drills, such for example as the drill forming a part of our co-pending application for United States Patent, Serial No. 352,854, and which will be operative to securely hold a drill bit or similar tool during its rotation.

Another object is to make our improved chuck of a strong and durable construction and so that the parts can be easily made, put together and taken apart.

These objects, and other advantageous ends which will be described hereinafter, we attain in the following manner, reference being had to the accompanying drawings in which—

Figure 1 is a longitudinal elevation of our improved chuck showing the same connected to a drill spindle, Fig. 2 is a section taken on the line 2—2 of Fig. 1, Fig. 3 is a transverse section taken on the line 3—3 of Fig. 1, Fig. 4, 5 and 6 are perspective views of certain of the elements of our invention, Fig. 7 is a view showing the elements of our invention in a detached position, and Fig. 8 is a view of similar nature to Fig. 2 showing the jaws in another position from that shown in Fig. 2.

Referring to the drawings, 9 represents a spindle, such for example as a drill spindle on a drilling device, and to this spindle is secured a stem 10; said stem having a cavity 11 into which a portion 12 of the spindle extends. A pin 13 is employed to secure the spindle to the stem 10. The stem 10 is externally screw threaded, as shown at 14, and this screw threaded portion fits within an internally screw threaded hole 15 in a head 16. The head 16 has an outer shell or hollow body portion 17 securely fixed thereto by a screw thread connection 18. The inner surface 19 of the shell 17 is frusto-conical and tapers outwardly as clearly shown in Figs. 2 and 8. This provides a chamber 20 in which is mounted a frusto-conical jaw-retainer 21 of a shape clearly shown in Fig. 4. The retainer 21 has three slots 22 extending inwardly from its inner end 23; said slots stopping short of the opposite end 24 and having enlarged portions 25 for a purpose hereinafter described. The retainer 21 is of such external diameter throughout its length that when the end 24 abuts the end surface 26 of the head 16 a space 27 is provided between the inner surface 19 of the shell 17 and the outer surface of said retainer. Jaws 28 taper toward their outer ends and are adapted to slidably fit within the slots 22. These jaws have oppositely disposed edge flanges 29 which fit within the space 27 between the retainer and the shell 17. The thickness of each of the jaws through the flanges 29 is greater than the width of the slot 22 in which the jaw is adapted to set so that said flanges 29 prevent the jaws from moving entirely through the slots toward the axis of the retainer 21, as is clearly obvious from Fig. 3. The innermost edges 30 of the jaws are preferably made so as to be parallel with the axis of the spindle and stem 10 so that when the jaws move together to engage the drill bit or other tool, they will provide line contacts for engagement with said tool and thereby firmly hold the tool to the chuck.

A cup or cap 31 is rotatably secured to the stem 10 by means of a double shouldered screw 32; said screw fitting a tapped hole 33 in the stem 10 and having a shoulder 34 abutting the end of the stem 10. The portion 35 of the screw 32 between the shoulder 34 and the shoulder 36 provides a rotatable bearing for the cup 31 and the head 37 of said screw is of larger diameter than the hole 38 of the cup through which the portion 35 extends. The forward edge of the cup 31 has three notches 39; said notches including contracted portions 40, as clearly shown in Fig. 5. Each of the jaws 28 has a lug 41 projecting from its inner end 42; said lugs being comparatively narrow at 43 and provided with enlarged heads 44. These lugs are adapted to respectively slide within the notches 39; the headed portion 44 fitting within the enlarged portions of the notches 39 while the contracted parts 43 fit within the contracted portions 40 of said notches 39.

The enlarged portions 25 of the slots 22 in the jaw retainer 21 permit the lugs 41 to pass therethrough into the notches 39 of the cup 31. The head 16 has a cavity 45 extending into its forward end into which a portion of the cup 31 extends and a flange 46 is provided on said head to fit into the rear portion of the jaw retainer 21 so as to provide a centering part for the inner end of said retainer.

Thus it is obvious that if the head 16 is turned relatively to the stem 10 that the jaws 28 will be moved lengthwise with respect to the shell 17 and since, during said latter movement, the jaws are compelled to follow the path prescribed by the frusto-conical retainer 21 and surface 19 of the shell 17, the edges 30 will be moved toward or from each other according to the direction of rotation of the head 16 on the stem 10. During this action, the lugs 41 will slide in directions transversely to the axis within the notches 39 of the cup 31 and since the cup 31 is freely rotatable but secured against longitudinal movement relatively to the stem 10, the parts will not bind during the movement of the jaws.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A chuck of the character described including a rotatable stem; a head in longitudinal screw threaded connection with said stem and having a shell secured thereto, said shell having a tapered inner surface; a cup rotatably secured to the inner end of said stem; jaws longitudinally slidable within said shell and transversely slidably connected to said cup, said head having an annular centering flange projecting into said shell; and a hollow frusto-conical retainer having slots therein in which said jaws are positioned, said retainer having a part fitting over said centering flange whereby the retainer is kept in central position but may be readily separated from the head; substantially as described.

2. A chuck of the character described including a stem having a screw threaded hole extending therein from its end; a head in longitudinal screw threaded connection with said stem and having a shell secured thereto, said shell having a tapered inner surface; a cup having a hole extending through its inner end of smaller diameter than the interior of said cup; a double shouldered screw fitting within said hole in the stem and having its inner surface abutting the end of the stem, the part of the screw between the inner and outer shoulders extending through the hole in the cup, the outer shoulder of the screw being of larger diameter than the hole in the cup and located within said cup whereby the cup is pivotally connected to the stem; and jaws slidably connected to said cup and extending into said shell; substantially as described.

In testimony whereof we have signed our names to this specification in the presence of two subscribing witnesses.

WILFRED E. TAIT.
WILLIAM MILNES.

Witnesses.
GEORGE R. LEWIS,
PHILIP B. BUZZELL.